FURNITURE LEG CONSTRUCTION

Filed Oct. 31, 1967

INVENTOR
O. C. WARD
BY Hughes, Rothwell, Mion, Zinn & Macpeak
ATTORNEYS

FURNITURE LEG CONSTRUCTION

Filed Oct. 31, 1967 3 Sheets-Sheet 2

INVENTOR
O. C. WARD
BY Seghrue, Rothwell, Mion, Zinn & Macpeak
ATTORNEYS

FURNITURE LEG CONSTRUCTION

Filed Oct. 31, 1967 3 Sheets-Sheet 3

INVENTOR

O. C. WARD

BY Sughrue, Rothwell, Mion, Zinn & Macpeak

ATTORNEYS

United States Patent Office 3,396,933
Patented Aug. 13, 1968

3,396,933
FURNITURE LEG CONSTRUCTION
Obediah C. Ward, 1228 Berkwood Road, Baltimore, Md. 21206
Filed Oct. 31, 1967, Ser. No. 679,423
6 Claims. (Cl. 248—431)

ABSTRACT OF THE DISCLOSURE

A furniture support device having at least two identical assembled leg units, each of the units having two leg elements provided with a transverse recess intermediate the ends thereof and a notch extending angularly inward from one edge of the leg in the area adjacent the recess so that when the legs are assembled, the recesses and notches cooperate to form a locking lap joint.

BACKGROUND OF THE INVENTION

*Field of the invention*

This invention relates to furniture support structures, especially legs for tables or the like.

*Summary of the invention*

The present invention is directed to a support device which is particularly adapted to serve as a furniture base although it is not intended to be so limited. The device is comprised of a plurality of legs which cross at a common point yielding a support structure which does not require any other parts or fixtures in its assembly. The finished assembly is not only structurally stable and sturdy but it is also pleasing to the eye.

The structure of the support device is such that it presents relative ease in manufacturing due to the several identical leg configurations of the various, completely assembled support structures. Due to its simplicity in design, the device may be easily assembled and disassembled. The structural characteristics of the device also lend to its compactness and portability making it easily stored or carried when disassembled.

According to the present invention, the furniture support device is comprised of at least four leg elements, with each leg having a transverse recess intermediate the ends thereof and a notch extending angularly inward from one edge of each leg in the area of the recess, allowing the legs to be assembled in such a manner that the recesses and notches will cooperate to form a locking lap joint. As will be described hereinafter in detail, the leg elements are assembled first into units of two crossed legs, then the assembled units are further assembled so that the notches of each unit cooperate with each other at the point of intersection of the units forming the rigid support device.

*Detailed description of the invention*

Figure 2:
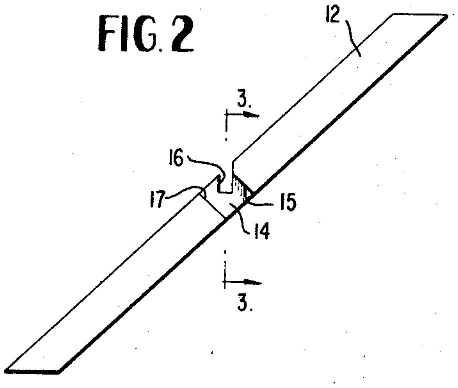
FIGURE 2 is a front elevation of a leg element of the support device of FIGURE 1.
Figure 1:
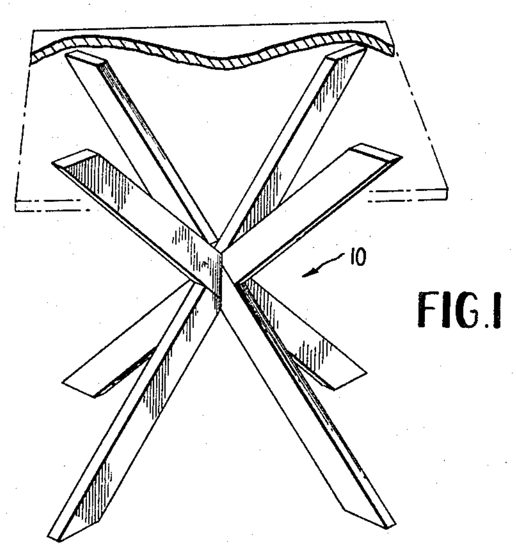
FIGURE 1 is a perspective view showing an assembled furniture support device having a four legged configuration.
Figure 3:
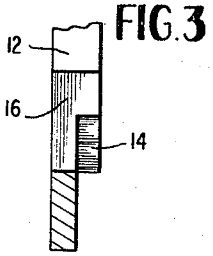
FIGURE 3 is a section view taken along the lines 3—3 of FIGURE 2.

Referring now to the drawings, the four legged embodiment of the furniture support device, shown in FIGURE 1, is comprised of four identical leg elements 12 made of metal, wood, plastic or any other suitable material, each leg having a transverse recess 14 extending inwardly into the leg to a depth of one half the thickness of the leg intermediate the ends thereof and a notch 16 formed in the area adjacent the recess of each leg, as shown in FIGURE 2. The legs 12 may be curved or straight and may be made from cast or cut pieces. The side walls 15 and 17 of each recess 14 are parallel and may be disposed at any angle to the leg 12 depending upon the desired height of the assembled structure. Notch 16, provided in each leg element 12 in the area adjacent the recess 14, extends angularly inward from one edge of the leg, as shown in FIGURES 2 and 3. The notch 16 opens along the edge of the leg and terminates intermediate the side walls of the recessed portion 14.

Figure 4:
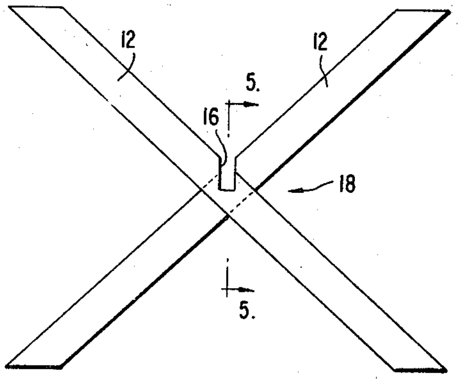
FIGURE 4 is a front elevation of an assembled leg unit.
Figure 5:
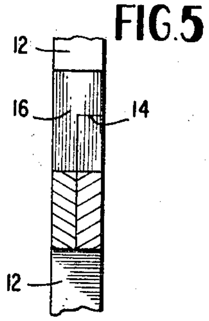
FIGURE 5 is a sectional view taken along line 5—5 of FIGURE 4.

Initial assembly of the furniture leg support device is accomplished by crossing two of the leg elements 12 so that the transverse recess 14 of one leg is received within the transverse recess 14 of the other leg forming a first assembled unit 18, as shown in FIGURES 4 and 5. With the legs so assembled, the notches 16 of each leg are aligned with the vertical axis being perpendicular to the ground.

Figure 6:
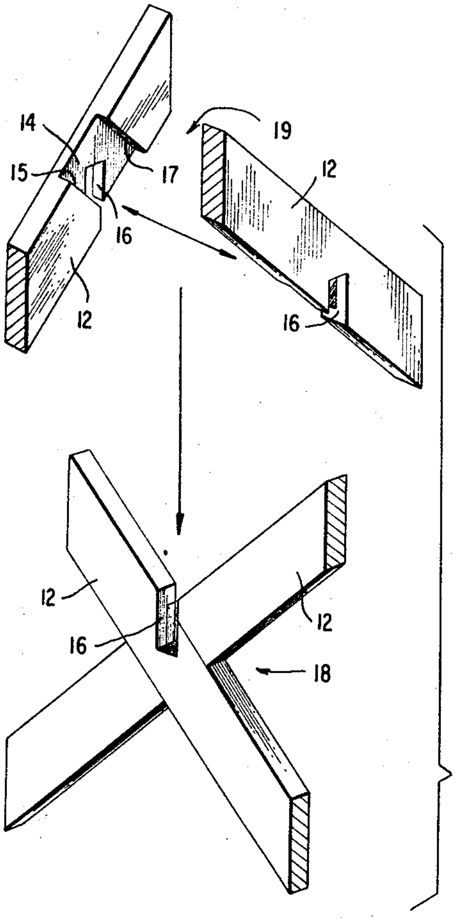
FIGURE 6 is an exploded view of the leg units showing the assembled relationship.

Referring to FIGURE 6, a second assembled unit 19, identical in structure and construction to the first assembled unit 18, is adapted to be joined to the first unit by inverting the second unit so that the notch 16 opens downwardly and is engageable with the upwardly opening notch of the first unit. As the notches of each unit engage with one another, a locking lap joint is formed at the intersection of the four legs, which joint provides a rigid interlock without the addition of further securing means. The locking lap joint increases in rigidity as the weight of the supported structure is placed upon the device, as indicated by the addition of a planar surface, as shown in FIGURE 1.

Figure 7:
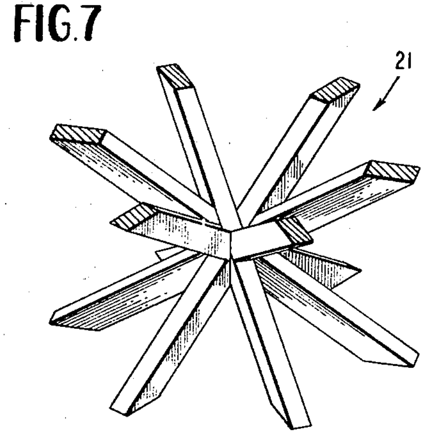
FIGURE 7 is a perspective view of a furniture support device having a six legged construction.
Figure 8:
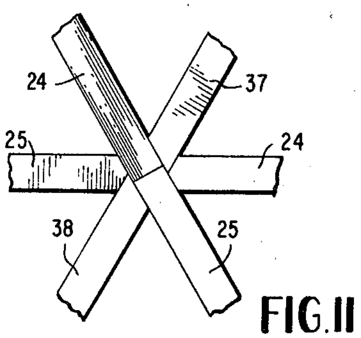
FIGURE 8 is a front elevation showing a first assembled leg unit of the six legged structure.

Referring now to FIGURES 7 through 11, a six legged furniture support device of the type shown in FIGURE 7 is comprised of a plurality of interlocked legs similar to those described hereinbefore in the four legged embodiment. FIGURE 8 shows a first assembled unit 23 comprised of a pair of legs 24 and 25, each leg having a transverse recess (not shown) intermediate the ends thereof and a notched portion 26 in leg 24 and leg 27 in leg 25, shown in FIGURE 8*a*.

Figure 8A:
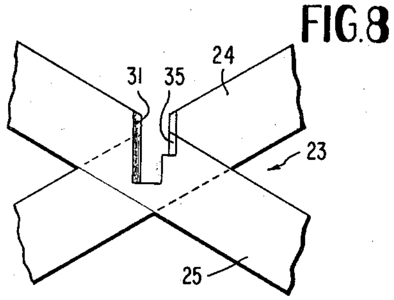
FIGURE 8*a* is a top view of the assembled leg unit of FIGURE 8 showing the notched portion.

Notch 26 of leg 24 is defined by upstanding side walls 28 and 29 which extend angularly inward from the side of leg 24 in the area adjacent the recess (not shown). As shown in FIGURE 8*a*, side walls 28 and 29 extend angularly inward with respect to each other.

Notch 27 of leg 25 is defined by parallel, upstanding side walls 31 and 33, base portion 32, a stepped portion 34 approximately midway of wall 33 and an upstanding wall 35 extending between the stepped portion 34 and the edge of leg 25, as shown in FIGURE 8. When the legs 24 and 25 are assembled, as shown in FIGURE 8, the respective notches 26 and 27 cooperate to form a notch structure similar to that shown in FIGURE 8*a*.

Figure 9:
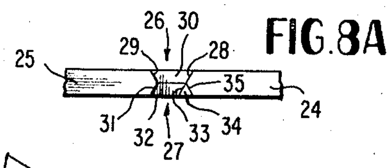
FIGURE 9 is a front elevation of a second assembled leg unit for the six legged structure.
Figure 9A:
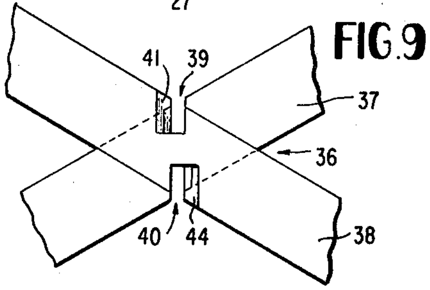
FIGURE 9*a* is a top view of the assembly of FIGURE 9 showing the notched portion of the structure.
Figure 10:
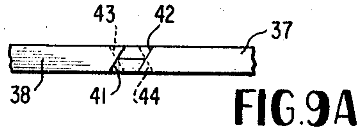
FIGURE 10 is an exploded view of the assembled structure of FIGURE 7 showing the relationship of the assembled units.

Turning now to FIGURE 10, the six legged support device 21 is assembled by taking two assembled units 23, shown in FIGURE 8, and a single assembled unit 36, shown in FIGURE 9, and crossing each relative to the other. A first unit 23 is positioned so as to have its notches 26 and 27 opening upwardly to form a bottom portion of the structure. Unit 36 is then crossed at an angle of approximately 60° to the bottom unit 23 so that the notches 26 and 27 of unit 23 cooperate with and receive notch 40 of unit 36 such that the top of notch 40 rests on the base portions 30 and 32 of the notches 26 and 27, respectively. A second assembled unit 23 is inverted relative to the first unit so that the notches 26 and 27 open downwardly and then is crossed at approximately 60° to unit 36. As the upper assembled unit 23 is lowered into place, the notches 26 and 27 cooperate with and are received in notch 39 of unit 36 and notches 26 and 27 of bottom unit 23. As with the four legged embodiment, the recesses and notches of the six legged structure cooperate to form a rigid locking lap joint which is capable of supporting a load withoct further securing means, such as bolts, screws, or the like.

Figure 11:
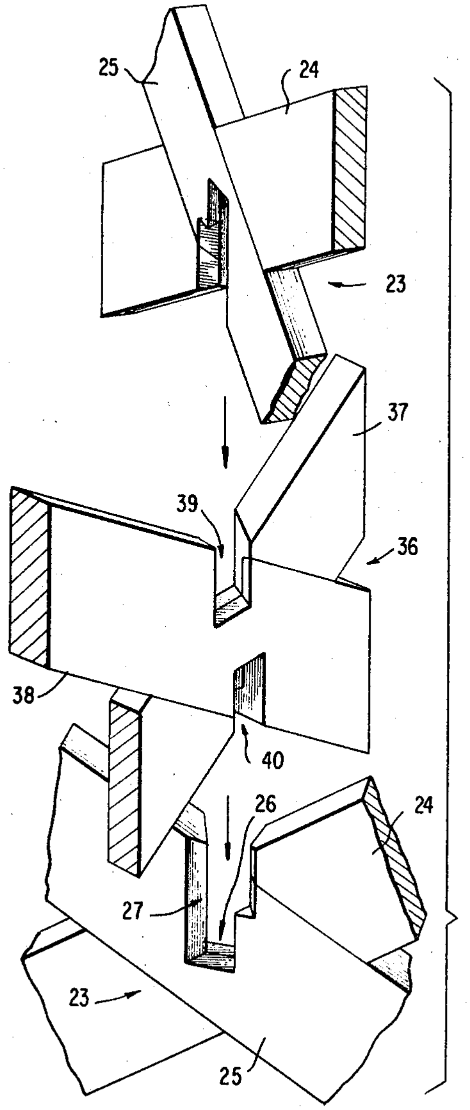
FIGURE 11 is a top view of the assembled structure showing the interlocking joint state.

FIGURE 11 shows the interlocking lap joint formed by the cross members when looking at the structure from either above or below.

Figure 12:
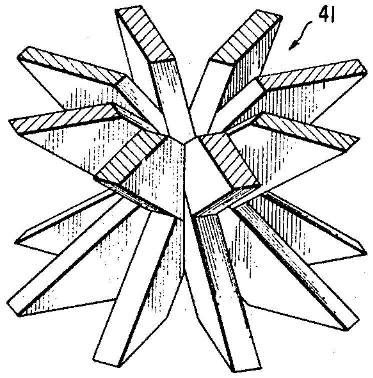
FIGURE 12 is a perspective view of an assembled eight legged structure.

The eight legged structure 41, shown in FIGURE 12, is similar in construction to the four and six legged structures described hereinbefore. In this embodiment, a pair of assembled leg units 42 and 43 are formed into a subassembly 44, which subassembly is adapted to receive a second subassembly 66 (shown in dotted lines in FIGURE 16) in an inverted relation to form the complete structure 41.

Figure 13:
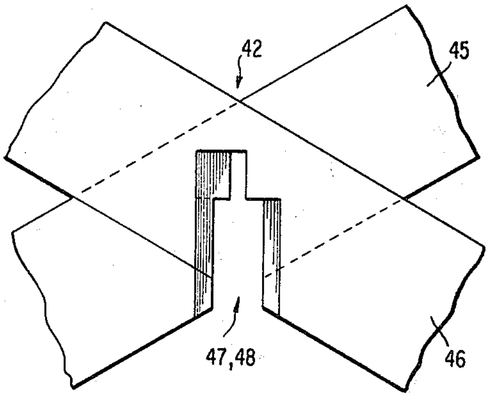
FIGURE 13 is a front elevation of a first assembled leg unit.
Figure 13A:
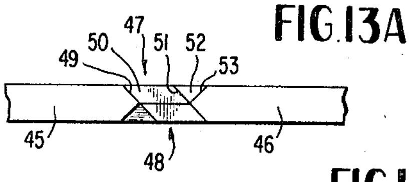
FIGURE 13*a* is a bottom view of the first assembled unit of FIGURE 13.

Referring to FIGURES 13 and 13*a*, assembled unit 42 is comprised of a pair of crossed legs 45 and 46 having transverse recesses therein (not shown) which cooperate with each other as described in detail hereinbefore so that a flush outer surface is formed when the two legs are crossed. Each leg 45 and 46 is provided with a respective notch 47 and 48 in the area of the recess and opening along one edge of the leg element.

Notch 47 is comprised of a pair of spaced parallel walls 49 and 51 which walls traverse the leg element at an angle of approximately 45°, a base portion 50, a stepped portion 52 of wall 51 which stepped portion is spaced from and parallel with base 50, and a vertical wall 53 extending from the stepped portion. Wall 53 extends angularly inward from the side of the leg perpendicular to wall 51.

Notch 48 of leg 46 is of similar construction to that of notch 47 but exactly opposite thereto, as shown in FIGURE 13*a*. When the leg elements 45 and 46 are assembled, as shown in FIGURE 13, the respective notches 47 and 48 cooperate to form the notched structure shown in FIGURE 13*a*.

Figure 14:
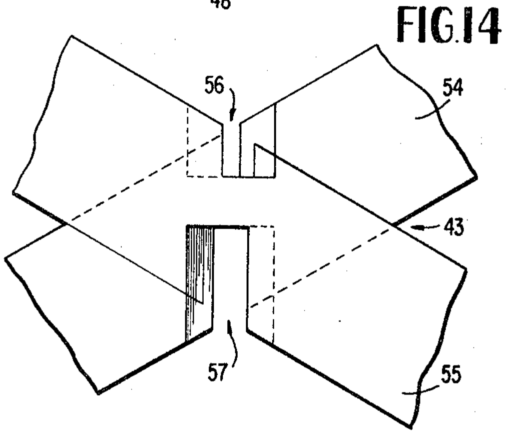
FIGURE 14 is a front elevation of a second assembled leg unit of the eight legged structure.
Figure 14A:
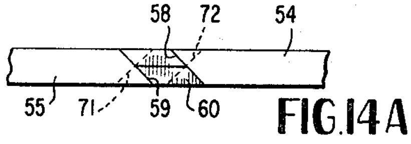
FIGURE 14*a* is a top view of the assembled leg unit of FIGURE 14.
Figure 14B:
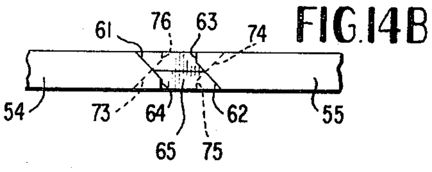
FIGURE 14*b* is a bottom view of the assembled unit of FIGURE 14.

The assembled unit 43, shown in FIGURE 14, like the other assembled units described hereinbefore, is provided with a transverse recess (not shown) in each of its crosslegged members 54 and 55, which recesses are adapted to cooperate to form a flush surface in the assembled unit. Leg elements 54 and 55, like the leg elements 37 and 38, shown in FIGURE 9, are provided with a pair of notches 56 and 57, respectively. The notches 56 and 57 open along opposite edges of the legs and are defined by spaced, parallel side walls 58 and 59 and base 60 of notch 56 and spaced, parallel walls 61, 62, 63, 64 and base portion 65 of notch 57, as shown in FIGURES 14*a* and 14*b*. The walls 61, 62 of notch 57 traverse the respective legs 54 and 55 at approximately 45°, while the walls 63, 64 traverse the legs approximately perpendicular to the edges of the legs.

Figure 16:
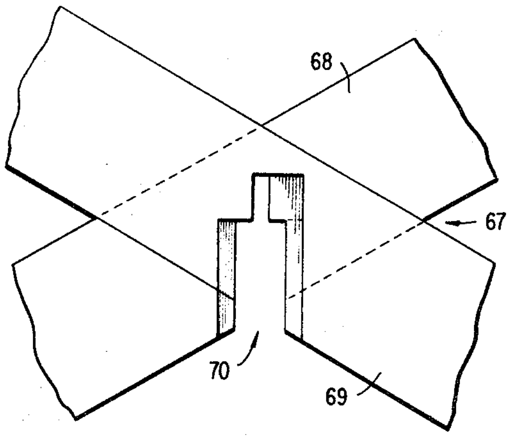
FIGURE 16 is a front elevation of a third assembled leg unit.

FIGURE 16 shows a third assembled leg unit 67 which is comprised of leg elements 68 and 69, each leg element having a transverse recess (not shown) intermediate the ends thereof. A notch 70 formed by the cooperating legs is similar to the notches 47 and 48 shown in FIGURE 13*a*. Notch 70 is the exact reverse of the notch formed by legs 45 and 46 (see FIGURE 13).

A fourth pair of crossed legs (not shown), similar to those shown in FIGURE 14, are adapted to cooperate with the crossed legs of FIGURE 16. The fourth assembled leg unit forms a pair of notches shown by the dotted lines of FIGURES 14*a* and 14*b*. The notch formed by the side walls 71–72 is adapted to be received in and engage with the composite notch 70 of FIGURE 16.

Figure 15:
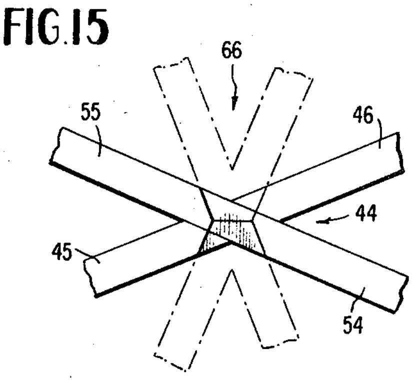
FIGURE 15 is a top view of a leg unit subassembly joining the leg units of FIGURES 13 and 14.

The eight legged support structure may be constructed by forming a pair of subassemblies 44 and 66, as shown in FIGURE 15. Subassembly 44 is comprised of first and second assembled units 42 and 43, the notch 56 of unit 43 being received in and engaged with the notch 47–48 of unit 42. The second subassembly 66 is formed so as to be identical to the first subassembly by engaging the third and fourth units in a similar manner. The notch formed by the side walls 71–72 of FIGURE 14*a* is received in and engaged by notch 70 of unit 67. The resulting notch formed by the assembled units is identical to that defined by the assembled units of the first subassembly.

The two subassemblies 44 and 66 are then inverted with respect to each other so that the composite notches (not shown), formed by the assembled units, will be received in and engaged with each other yielding a locking lap joint capable of supporting the weight of a furniture piece without the need of further hardware securing means.

FIGURE 12 shows the interlocking relationship of the leg elements forming the locking lap joint after the two subassemblies have been joined to form a composite eight legged structure. It is not necessary that any of the legs described in either of the three embodiments be straight. The legs may be curved if so desired or the heights of the support structure may be changed by adjusting the location of the locking lap joint with respect to the leg elements used.

In all cases, the support structures may be disassembled as easily as they are assembled and in this manner, they may be easily stored or transported in a knockdown condition and reassembled later when use is necessary.

While the invention has been particularly shown and described with reference to particular preferred embodiment thereof, it will be understood by those skilled in the art that the foregoing and other changes in form and details may be made therein without departing from the spirit and scope of the invention.

What is claimed is:

1. A support device comprising at least two identical assembled leg units, each of said assembled units being comprised of two leg elements each of which have a transverse recess intermediate the ends thereof and a notch opening along one edge of said leg and extending angularly inward therefrom in the area adjacent said recess, wherein said leg elements of each unit are assembled in a crossed relation with the recess of one leg received in and cooperating with the recess of the other leg so as to align said notches and form an uninterrupted surface in the area of intersection of said leg elements and wherein said units are assembled together in a crossed angular relation with each other with the notches of each unit engaged in and interlocked with the notches of the other unit to form a rigid locking lap joint.

2. A furniture support device comprised of four identical leg elements, each of said elements having a transverse recess intermediate the ends thereof and a notched portion in the area adjacent said recess wherein said leg elements are assembled in two identical units of two in crossed relation with the recess of one of said leg elements received in and cooperating with the recess of the other of said leg elements to align the axis of said notches perpendicular to the ground and form uninterrupted surfaces in the area of intersection of said legs, and wherein said units are assembled together in a crossed angular relation with each other with the notches of each unit cooperating with and engaging each other to form a rigid locking lap joint.

3. A furniture support device as set forth in claim 2 wherein said notched portion of each of said leg elements is defined by a pair of spaced parallel side walls extending angularly inward into said leg contiguous with said recess, a bottom portion and an open portion adjacent one edge of said leg element.

4. A furniture support device comprised of six legs, each of said legs having a transverse recess intermediate the ends thereof and a notched portion in the area adjacent said recess, wherein said legs are assembled in units of two in crossed relation with the recess of one of said legs received in and cooperating with a recess of the other leg of the unit thereby aligning said notches and forming an uninterrupted surface in the area of intersection of said legs and wherein said units are assembled together in crossed interlocked relation by means of rigid locking lap joints.

5. A furniture support device as set forth in claim 4 wherein one of said units is provided with a pair of notches opening along opposite edges of the legs and which are engaged in interlocking relation with the notches in the other of said unit respectively.

6. A furniture support device comprised of eight legs, each of said legs having a transverse recess intermediate the end thereof and a notched portion in the area adjacent said recess, wherein said legs are assembled in units of two in crossed relation with the recess of one of said legs received in and cooperating with the recess of the other leg of the unit thereby aligning said notches and forming an uninterrupted surface in the area of intersection of said legs and wherein two of said units are assembled in crossed interlocking relation to define a first subassembly and the other two of said units are assembled together in crossed interlocking relation to define a second subassembly identical to said first subassembly, said subassemblies being assembled together in angular interlocking relation with each other by means of a rigid locking lap joint at the point of intersection of all of said legs.

References Cited

UNITED STATES PATENTS

| | | | |
|---|---|---|---|
| 410,947 | 9/1889 | Vosburgh. | |
| 595,686 | 12/1897 | Allgauer. | |
| 1,089,289 | 3/1914 | Thompson. | |
| 1,230,545 | 6/1917 | Wanner. | |
| 1,577,724 | 3/1926 | Jenkins | 248—165 |
| 2,444,991 | 7/1948 | Hunter | 297—442 |
| 2,271,496 | 1/1942 | Hofman. | |
| 2,672,658 | 3/1954 | Pedersen | 289—189.36 |

FOREIGN PATENTS

| | | |
|---|---|---|
| 409,323 | 4/1934 | Great Britain. |

ROY D. FRAZIER, *Primary Examiner.*

R. P. SEITTER, *Assistant Examiner.*